(12) United States Patent
Zehnder et al.

(10) Patent No.: US 8,807,397 B2
(45) Date of Patent: Aug. 19, 2014

(54) DOSAGE-DISPENSING DEVICE FOR FREE-FLOWING SUBSTANCES

(71) Applicant: Mettler-Toledo AG, Greifensee (CH)

(72) Inventors: Marc Zehnder, Zürich (CH); Pascal Frei, Rapperswil (CH)

(73) Assignee: Mettler-Toldeo AG, Greifensee (CH)

( * ) Notice: Subject to any disclaimer, the term of this patent is extended or adjusted under 35 U.S.C. 154(b) by 72 days.

(21) Appl. No.: 13/744,717

(22) Filed: Jan. 18, 2013

(65) Prior Publication Data

US 2013/0192715 A1   Aug. 1, 2013

(30) Foreign Application Priority Data

Jan. 26, 2012 (EP) ..................................... 12152579

(51) Int. Cl.
*B67D 7/84* (2010.01)
*G01G 13/00* (2006.01)
*B01L 3/02* (2006.01)
*B65B 1/06* (2006.01)
*G01G 13/02* (2006.01)

(52) U.S. Cl.
CPC ............... *B65B 1/06* (2013.01); *G01G 13/003* (2013.01); *B01L 3/02* (2013.01); *G01G 13/024* (2013.01); *B01L 2200/0657* (2013.01)
USPC ............... 222/161; 222/56; 222/63; 222/160; 222/167; 222/164; 141/284; 294/116

(58) Field of Classification Search
USPC ............... 222/56, 63, 77, 161, 164–167, 160, 222/144, 325, 333, 196, 197; 141/83, 284, 141/71; 294/116
See application file for complete search history.

(56) References Cited

U.S. PATENT DOCUMENTS

| | | | |
|---|---|---|---|
| 5,893,700 A * | 4/1999 | Kronseder ................. | 414/744.2 |
| 6,652,015 B1 * | 11/2003 | Carney et al. ................ | 294/86.4 |
| 6,805,548 B1 * | 10/2004 | Evrard .......................... | 425/540 |
| 2006/0136095 A1 * | 6/2006 | Rob et al. ...................... | 700/245 |
| 2008/0114328 A1 * | 5/2008 | Doherty et al. ............... | 604/414 |
| 2008/0173668 A1 | 7/2008 | Bloechlinger et al. | |
| 2009/0067973 A1 * | 3/2009 | Eliuk et al. .................... | 414/729 |
| 2009/0126825 A1 * | 5/2009 | Eliuk et al. ........................ | 141/1 |
| 2011/0220686 A1 | 9/2011 | Lüchinger et al. | |

* cited by examiner

*Primary Examiner* — Paul R Durand
*Assistant Examiner* — Jeremy W Carroll
(74) *Attorney, Agent, or Firm* — Standley Law Group LLP

(57) ABSTRACT

A device that dispense dosages of a free-flowing substance has a support column with a horizontal support arm (10) cantilevered thereon. The device includes a holder unit (20) on which at least one movably supported receiving unit (30) is arranged. The receiving unit is designed so that at least one dosage unit (70) can be set into, as well as taken out of, it. The holder unit contains at least one agitation actuator (50) that acts on the receiving unit. The dosage unit can be fastened to the receiving unit by means of a pre-tensioned clamping module (60). For the insertion and/or removal of the dosage unit, the clamping module can be spread apart from a dispensing position into a loading position by means of an opener module that is based on the holder unit. In the dispensing position, the opener module is uncoupled from the receiving unit.

16 Claims, 4 Drawing Sheets

DOSAGE-DISPENSING DEVICE FOR FREE-FLOWING SUBSTANCES

CROSS-REFERENCE TO RELATED APPLICATIONS

This application is entitled to benefit of a right of priority under 35 USC §119 from European patent application 12152579.4, filed 26 Jan. 2012, the content of which is incorporated by reference as if fully recited herein.

TECHNICAL FIELD

The disclosed embodiments concern a dosage-dispensing device for free-flowing dosage materials, specifically powders, granulates and pastes, with a support column and with a horizontal support arm that is cantilevered on the support column and includes a seat for an exchangeable dosage unit from which defined quantities of the dosage material are dispensed into a target container that is set up below the dosage unit, typically standing on a load receiver platform of a balance.

BACKGROUND

Dosage-dispensing devices with dosage units that normally include a source container and a dispensing head are used in particular for applications where small dosage quantities of, e.g., toxic substances are dispensed with high precision into small target containers. In many cases, the target container is placed on a balance in order to weigh the amount of substance dispensed from the dosage-dispensing device so that the latter can subsequently be processed further in accordance with a given purpose.

A dosage-dispensing device in which a dosage unit with a source container and a dispensing head can be emplaced is described in commonly-owned and co-pending US published application 2011/0220686. The source container is in essence a cylindrical container which, after having been filled with dosage material, is closed up with the dispensing head. The dispensing head includes a base unit which has an end surface and a coupling area for the source container or for a closure lid. Arranged in the end surface of the base unit is an outlet orifice which is connected to the coupling area. The dispensing head further includes a slide shutter which is held in a linear track in the base unit allowing guided movement parallel to the end surface. The slide shutter is controlled by an actuating member which is arranged on the base unit, rotatable about an axis that is orthogonal to the end surface, and includes a window, wherein for any position of the actuating member relative to the base unit, the outlet orifice lies within the area of the window. The slide shutter has a passage opening and is arranged between the base unit and the actuating member. By turning the actuating member relative to the base unit, the slide shutter can be moved in a straight line relative to the base unit and, in consequence, the aperture profile of the dispensing head can be varied as a result of the passage opening being shifted relative to the outlet orifice, and the stream of free-flowing material through the passage opening can be regulated.

In the operating position, the dosage unit installed in the dosage-dispensing device is oriented with the dispensing head facing downward and the outlet orifice located directly above the target container. The dosage unit therefore has to be already in the upside-down position when it is put into a seat of the dosage-dispensing device, or the dosage-dispensing device has to be equipped with seat that can be turned upside down and in which the dosage-dispensing unit can be secured by a restraining device against falling out.

A dosage-dispensing device with a seat for a dosage unit that can be turned upside down is shown in FIG. 6 of US 2011/0220686 which has already been cited above. After it has been set into the seat in upright orientation, i.e. with the dispensing head on top, the dosage unit is locked in place by a holder ring which can swivel, slide and be locked on a guide rod, before the seat is turned upside down, whereby the dosage unit is brought into the operating position.

Especially in the interest of operating safety, it appears highly desirable to automate the function of locking and unlocking the dosage unit and in particular to couple the locking/unlocking function with the turning-over of the dosage unit in its seat in such a way that it is absolutely impossible for the dosage unit to drop out of the seat. However, based on FIG. 6 and the accompanying description in US 2011/0220686 one has to conclude that the three steps of the securing procedure, i.e. the swiveling, sliding and locking of the holder ring have to be done manually by a human operator, before the seat with the dosage unit is turned upside down about a horizontal axis.

However, on closer examination of the securing concept with a holder ring that swivels, slides and locks on a guide rod, it is evident that a suitable actuating mechanism for this process would be relatively complicated and thus expensive. This clearly indicates a need for a fundamentally different concept to secure the dosage unit in the seat of the dosage-dispensing device.

Furthermore, in connection with the dosage-dispensing device of FIG. 6 in US 2011/0220686, it is proposed to loosen up the dosage material by turning the dosage unit in its seat about a horizontal axis repeatedly back and forth in alternating succession before the dosage-dispensing process. However, for the loosening of the dosage material as well as for separating it from the inside wall of the source container, shock movements are much more effective than the comparatively gentle turning-over movement about the horizontal axis.

A present objective, then, is to provide a dosage-dispensing device with a seat for a dosage unit, wherein the dosage unit that has been placed into the seat is secured by a holder device against falling out when turned upside down and can furthermore be subjected to a shock movement to loosen up the dosage material, wherein the holder device as well as the device for generating the shock movement are designed for a simple automated mode of operation.

SUMMARY

This task is solved by a dosage-dispensing device as claimed below. Advantageous embodiments and details thereof are presented in the dependent claims.

A dosage-dispensing device for preparing measured quantities of free-flowing substances has a support column as well as a horizontal support arm which is cantilevered on the support column and includes a holder unit on which at least one movably supported receiving unit is arranged. The receiving unit is designed for at least one dosage unit to be put in place as well as to be taken out, wherein the holder unit contains at least one agitation actuator acting on the receiving unit. The movement of the receiving unit which is generated by the agitation actuator serves to loosen the dosage material which is located in the dosage unit.

The design of the dosage unit which normally includes a source container and a dispensing head is described and illustrated in detail in US 2011/0220686 which in regard to the content of its disclosure is hereby fully incorporated herein by reference.

After the dosage unit has been set in place in the receiving unit, it can be fastened to the receiving unit by means of a pre-tensioned clamping module. Fastened this way, the dosage unit is protected against falling out of its seat in the receiving unit. This is indispensable in particular in dosage-dispensing devices where the dosage unit is set into the receiving unit with the dispensing head up and is subsequently brought into the dispensing position by turning the receiving unit upside down. Besides, in order to effectively transmit the aforementioned movement for the loosening of the dosage material, it is likewise important that the dosage unit remains firmly tied to its seat in the receiving unit. To release the clamp when a dosage unit is to be put in or taken out, the clamping module is designed so that it can be spread apart from a dispensing position into a loading position by means of an opener module that is based on the holder unit, wherein the opener module is uncoupled from the receiving unit when the apparatus is in the dispensing position. In other words, the opener module is engaged and in contact with the clamping module only in the loading position in order to spread the clamping module apart and hold it open while the dosage unit is set in place or removed.

The clamping module in a preferred embodiment of the dosage-dispensing device includes at least one spring element which, in the dispensing position of the apparatus, is under pre-tension and thereby produces the clamping force. Especially practical is a solution where two identical halves of the clamping module are formed as stamped sheet metal parts and configured in such a way that they can be spread apart through elastic deformation, so that the function of the spring element is incorporated in the clamping module halves. However, it is also possible to produce the clamping module through other suitable manufacturing processes including for example die-casting, milling or laser-cutting.

A preferred embodiment of the clamping module has two clamping jaws. When the clamping module is in the dispensing position, the dosage unit is held between the two clamping jaws in a vertically defined and immovable position relative to the receiving unit. In relation to a vertical central axis of the dosage unit the clamping jaws are arranged diametrically opposite each other.

Advantageously at least one of the clamping jaws is equipped with a position-defining element. Through mutual engagement between the position-defining element and a complementary surface feature that is formed on the dosage unit, the latter can be set into the receiving unit in a defined rotary position relative to the vertical central axis.

The clamping module in preferred embodiments is fastened to the receiving unit. Accordingly, the clamping module is a part of the receiving unit and therefore participates in the movements of the receiving unit during the dispensing process.

The opener module has preferably two pusher arms which are designed to push apart the two clamping jaws of the clamping module so that the dosage unit can be put in place or taken out.

Each pusher arm has a first end and a second end. The first end of each pusher arm is pivotally connected to the holder unit, while the opposite, second end of the pusher arm is arranged in a free space between the dosage-dispensing unit and the clamping jaw.

It is advantageous if the second end of each pusher arm has a nose-shaped contour projection directed towards the respective clamping jaw so that, in the interest of a compact design, the free space between the dosage unit and the clamping jaw can be kept as narrow as possible. Especially for cylindrical dosage units, this design feature is conducive to a compact arrangement.

As mentioned above, in the dispensing position the opener module is uncoupled from the receiving unit. In the dispensing position, the second ends of the pusher arms are therefore removed from contact with the receiving unit and with the clamping module that is connected to it.

In a preferred embodiment of the opener module, the pusher arms can be moved from the dispensing position to the loading position by means of a rotatable actuator element. The actuator element can be configured for example as a rotatable disk with an elliptical guide track. Through the cooperation of the guide track with pins that are arranged on the pusher arms, a rotation of the actuator element causes the pusher arms to move from the closed position into the spread-apart loading position.

The movable constraint of the receiving unit on the holder unit is preferably realized in the form of a flexible connection, for example through an arrangement where the receiving unit is movably constrained to the holder unit by elastic parallel-guiding members.

The at least one agitation actuator which is based in the holder unit and acts on the receiving unit includes preferably a motor which, by way of a cam- or contour disk, imparts shaking- or shocking movements to the resiliently constrained receiving unit with the purpose of loosening the dosage material contained in the dosage unit.

In preferred embodiments of the dosage-dispensing device, the support arm on the support column can be turned about a horizontal axis H from a loading position into a dispensing position. However, the invention also covers embodiments where the support arm is not movable and the dosage unit is therefore not turned upside down after it has been set into the receiving unit. In this case, too, it is still important to retain the dosage unit firmly in its seat in the receiving unit in order to allow the aforementioned shaking- and shocking movements to be transmitted effectively to the dosage material contained in the dosage unit.

BRIEF DESCRIPTION

Details of the dosage-dispensing device will become apparent from the description of the examples of embodiments that are illustrated in the drawings, wherein identical parts are identified by identical reference numbers and wherein.

DETAILED DESCRIPTION

Figure 1:
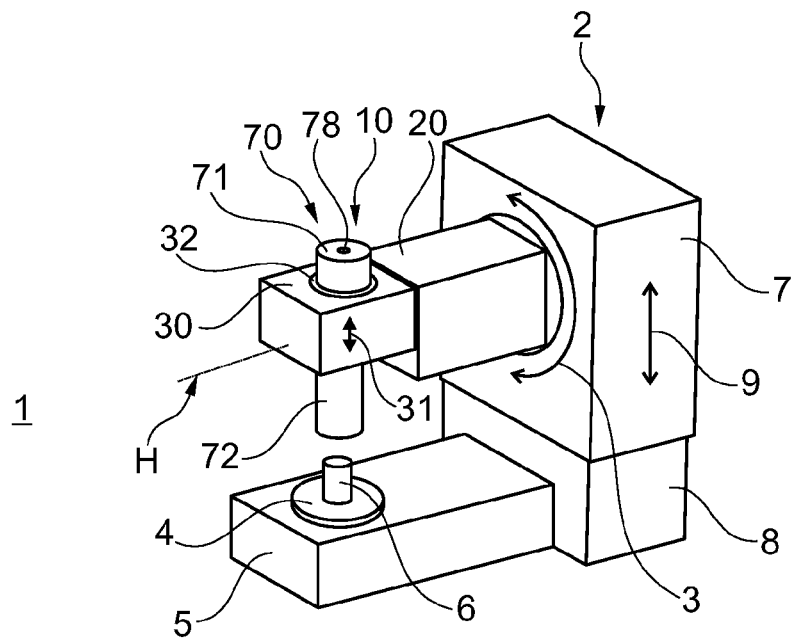
FIG. 1 is a perspective view of a schematic embodiment of the dosage-dispensing device with the support arm in loading position and with a dosage unit in place.

FIG. 1 illustrates the principal arrangement of a dosage-dispensing device with a support column 2 which holds a support arm 10 with the ability to rotate about a horizontal axis H as indicated by the circular arrow 3. The support arm 10 includes a holder unit 20 as well as a receiving unit 30 which is movably supported on the holder unit 20. Seated in the receiving unit 30 is a dosage unit 70 which includes a source container 71 and a dispensing head 72 and whose configuration is described in detail in US 2011/0220686 which has been cited above. The holder unit 20 includes at least one agitation actuator (not visible in FIG. 1) to generate the movement indicated by the bidirectional arrow 31 which serves to loosen and to discharge the dosage material that is contained in the dosage unit 70. The dosage-dispensing device 1 in FIG. 1 is shown in loading position, where the dosage unit 70 is set into the receiving unit 30 with the source container 71 first, i.e. with the dispensing head 71 pointing upward. This orientation of the dosage unit 70 is preferred for the storage of pre-filled dosage unit, because it prevents the risk that the outlet orifice 78 could become clogged up by compacted dosage material. For the dispensing process, the dosage unit 70 is secured in its seat 32 in the receiving unit 30 as will be described below and turned upside down through the aforementioned rotation 3 about the horizontal axis H, so that the outlet orifice 78 is located above the target container 6 which is standing on the weighing pan 5 of a balance 4. The support column 2 can have a stationary bottom part 7 and top part 8 which can be raised and lowered as indicated by the bidirectional arrow 9, so that the vertical position of the support arm 10 is adaptable to target containers 6 of different heights. The balance 5 can be a unit that is permanently connected to the dosage-dispensing device 1, or it could also be a free-standing laboratory balance which is arranged below the support arm 10.

Figure 2:
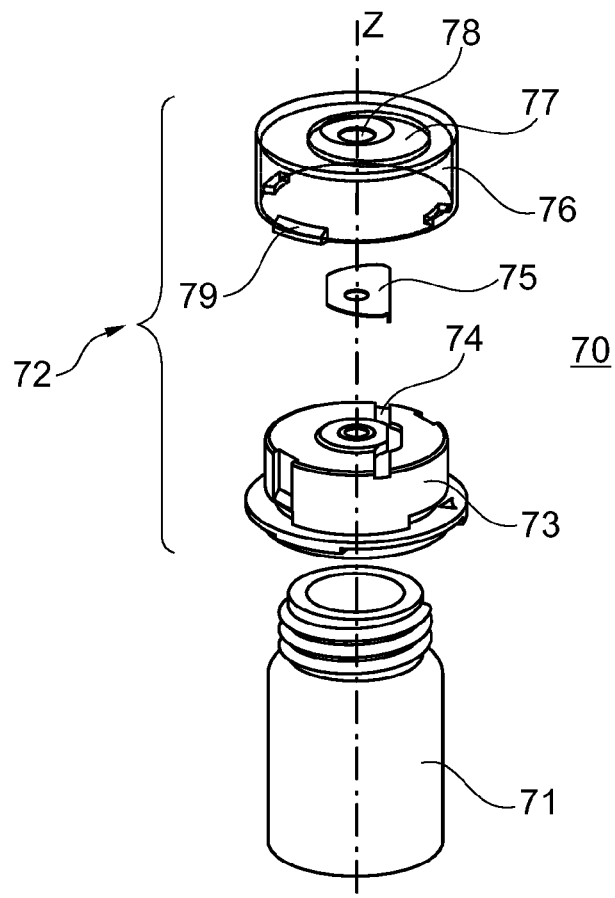
FIG. 2 is an exploded view of a dosage unit according to the state of the art.

As can be seen in FIG. 2 (which has been taken over from US 2011/0220686), a dosage unit 70 that fits into the seat opening of the receiving unit 30 is essentially cylindrical and includes a source container 71 as well as a dispensing head 72. The dispensing head 72 includes a base unit 73 designed to be screwed onto the source container 71, a slide shutter 75 which is constrained for linear movement in a guide track 74 of the base unit 73, as well as an actuating member 76 which fits over the base unit 73 like a cup and can be turned relative to the base unit 73. With a rotary movement of the actuating member 76 about the cylinder axis Z of the dosage unit, an eccentric 77 which is formed on the inside of the actuating member 76 causes the slide shutter 75 to change its position, whereby the aperture profile of the outlet orifice 78 can be varied continuously between the open and the closed position.

Figure 3:
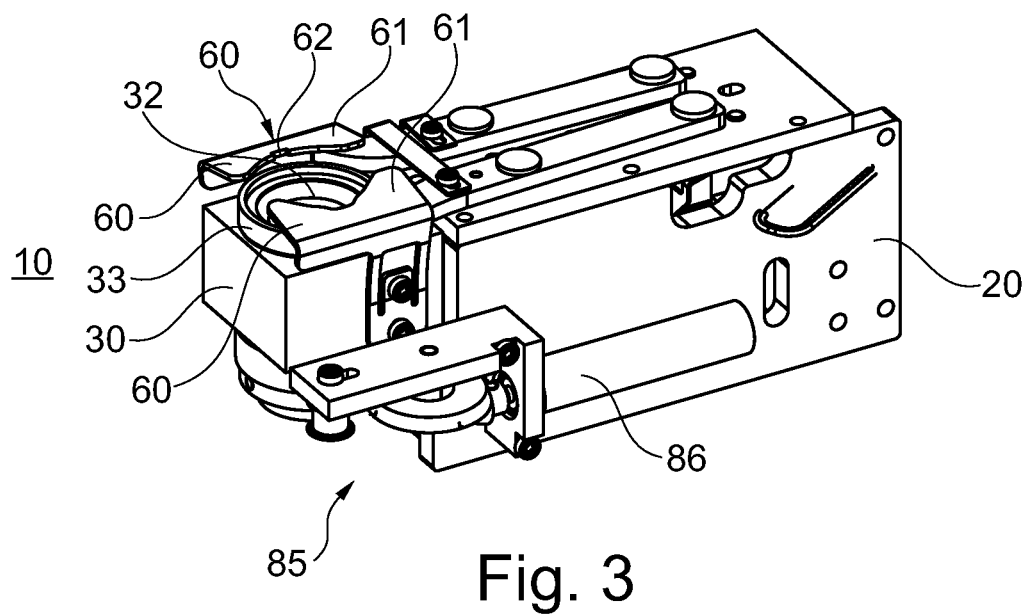
FIG. 3 is a detail view of the support arm of the FIG. 1 dosage-dispensing device in loading position, but without a dosage unit.

In a perspective view directed at an angle from above, FIG. 3 shows a detailed representation of the support arm 10 of the dosage-dispensing device 1 in the loading position, including the holder unit 20 and the receiving unit 30, but without a dosage unit 70 in the seat 32. One will note in particular the clamping module 60 with the two clamping jaws 61 shown here in the loading position, i.e. spread apart. In the illustrated embodiment, the clamping jaws 61 are sheet-metal stampings made of a spring-elastic material and are fastened to the sides of the receiving unit with screws. In the dispensing position, i.e. when the clamping module 60 is not pushed apart, the dosage unit 70 or, more specifically, the actuating member 76 of the dispensing head 72 is held between the two clamping jaws 61 in a vertically defined and immovable position relative to the receiving unit 30. In relation to the seat 32 the clamping jaws 61 are arranged diametrically opposite each other. At least one of the clamping jaws 61 is equipped with a first position-defining element 62, configured here as a first indent 62 in the contour of the clamping jaw 61 that is farther away from the viewer. Through mutual engagement between the first indent 62 and a complementary projection 79 of the actuating member 76 of the dispensing head 72 (see FIG. 2), the actuating member 76 is held in a defined rotary position relative to the receiving unit 30. The hollow cylindrical seat 32, on the other hand, is rotatably supported in the receiving unit 30 and carries at its upper rim a second position-defining element 33 in the form of a second indent 33 which, through mutual engagement with a complementary projection 80 of the base unit 73 (see FIG. 2) transmits a rotary movement of the seat 32 to the base unit 73. As explained above with the help of FIG. 2, turning the base unit 73 relative to the actuating member 76 causes a linear movement of the slide shutter 75, whereby the discharge of dosage material from the outlet orifice can be controlled. The required rotary movement of the seat 32 is generated by a position-setting module 85 with a second actuator motor 86 which is arranged at the forward-facing side (in FIG. 3) of the holder unit 20 and connected to the rotatable seat 32 through a revolving motion-transmitting means 87.

Figure 4:
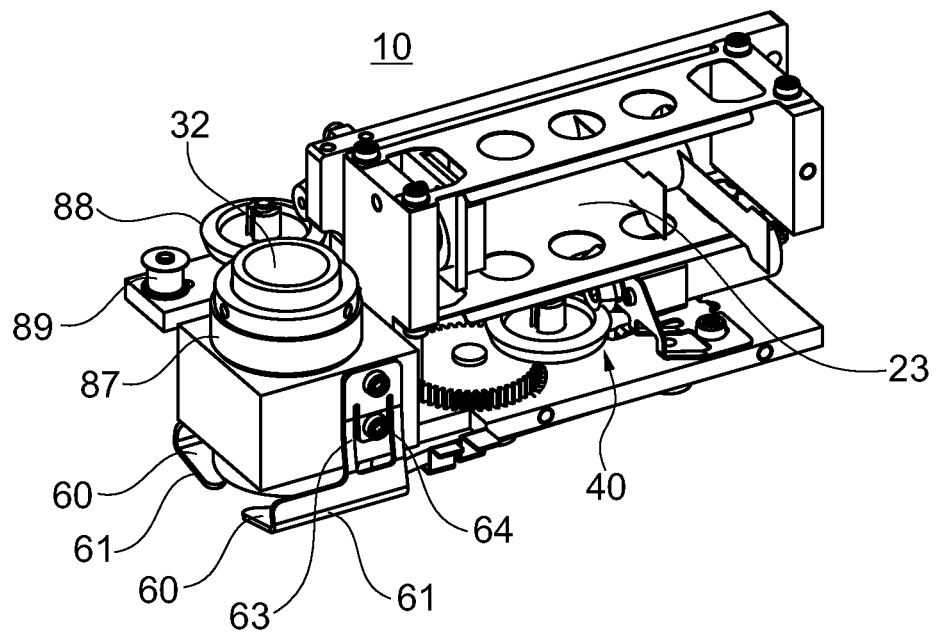
FIG. 4 shows the support arm of FIG. 3 in dispensing position.

FIG. 4 shows the same support arm 10 in the dispensing position. In the upper part of the drawing, the actuator mechanism 23 can be seen which generates the movement of the receiving unit 30 (as indicated in FIG. 1) for the loosening of the dosage material in the dosage unit 70, and in the lower part the opener module 40 which actuates the opening and closing of the clamping jaws 61. The actuator 50 and the opener module 40 will be described in detail below in the context of FIGS. 5 to 7. FIG. 4 further illustrates the design of the clamping module 60, whose identical halves are produced as stampings of a flat elastic material, with a spring portion or spring element 63 formed between the fastening area 64 and the clamping jaw 61, so that in the dispensing position the clamping jaws 61 are pressed against the actuating member 76 of the dosage unit 70 (see FIG. 2) by a pre-tension of the spring elements 63. FIG. 4 further illustrates how the position-setting module 85 (see FIG. 3), by way of a revolving motion-transmitting means 87, for example a drive belt 87 with a drive pulley 88 and a tensioning pulley 89, sets the rotary position of the seat 32 to which the base unit 73 of the dispensing head 72 is locked in joint rotation, wherein the rotary position of the base unit 73 relative to the actuating member 76 determines, through the slide shutter 75 (see FIG. 2) the aperture profile of the outlet orifice 78.

Figure 5:
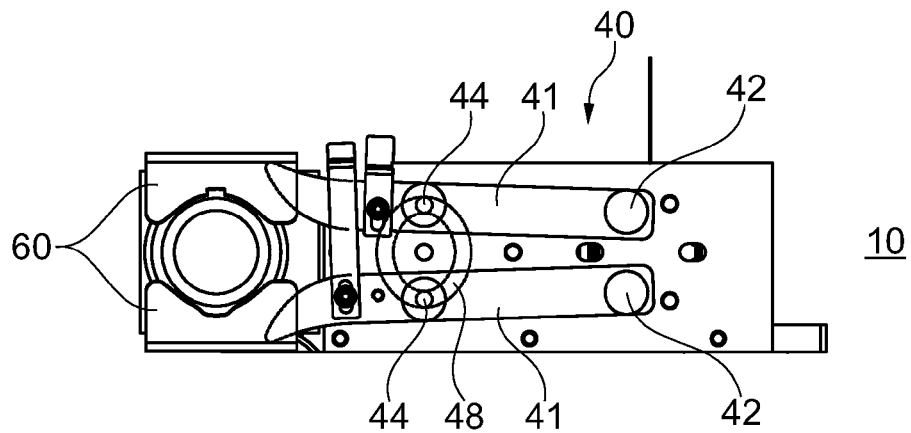
FIG. 5 shows the support arm of FIG. 3 in loading position with the view directed at the pushed-apart clamping module and opener module.
Figure 6:
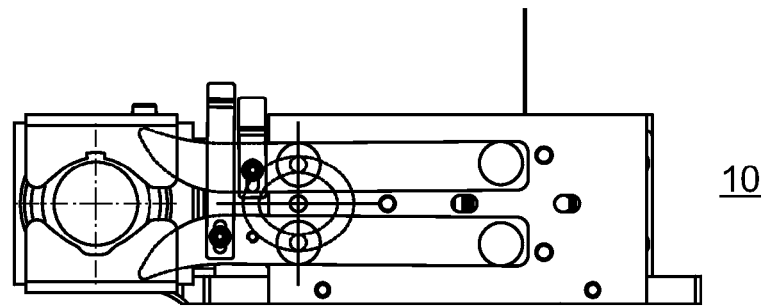
FIG. 6 shows the support arm of FIG. 3 in dispensing position with the view directed at the closed clamping module and opener module.

In FIGS. 5 and 6, which show the support arm 10, the view is directed at the clamping module 60 and the opener module 40 in loading position (FIG. 5) and in dispensing position (FIG. 6). The two pusher arms 41 of the opener module 40 have first ends 42 pivotally connected to the base plate 21 of the holder unit 20. In the loading position shown in FIG. 5, the nose-shaped second ends 43 of the pusher arms 41 are pushing from the inside against the two clamping module halves, whereby the clamping jaws 61 are spread open. In the dispensing position shown in FIG. 6, on the other hand, the second ends 43 of the pusher arms 41 are removed from contact with the clamping module halves, so that the clamping jaws 61 are pressed by the pre-tension of the spring elements 63 against the actuating member 76 of a dosage unit 70 that is in the seat 32. Each of the pusher arms 41 carries a guide pin 44 between the first and the second end. The guide pins 44 extend through openings 22 (FIG. 7) in the base plate 21 into the interior of the opener module 40, where they are engaged in an elliptical guide track 48 of the rotatable actuating element 47, so that a 90° turn of the actuating element 47 moves the pusher arms 41 between the open and the closed position. In the loading position as shown in FIG. 5, the elliptical guide track 48 (drawn with dotted lines) is oriented with its longer main diameter transverse to the pusher arms, so that the pusher arms 41 are held in the maximally open position by the guide pins 44. In the dispensing position shown in FIG. 6, on the other hand, the shorter main diameter of the elliptical guide track 48 is oriented transverse to the pusher arms, so that the latter are held in the maximally closed position by the guide pins 44.

Figure 7:
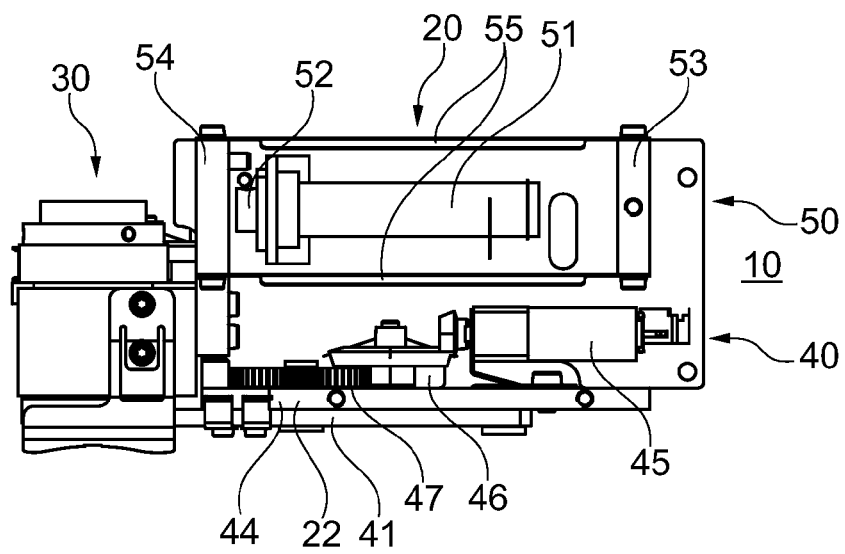
FIG. 7 shows the support arm of FIG. 3 in dispensing position seen from the side, with pushed-apart clamping module.

FIG. 7 serves to illuminate details of FIGS. 4 to 6 showing again in a side view the support arm 10 with the actuator 50 in the upper part and the opener module 40 in the lower part of the holder unit 20. The actuator 50 includes a parallel-guiding mechanism with a first parallelogram leg 53 firmly attached to the holder unit 20 and with a second, movable parallelogram leg 54 which supports the receiving unit 30 and is constrained to the first parallelogram leg 53 by parallel-guiding members 55, so that the receiving unit can move up and down in relation to the holder unit 20 within a limited vertical range. A drive motor 51 mounted on the rear wall (relative to the viewer) serves to impart by way of the cam disk 52 a shocking or shaking movement to the second parallelogram leg 54 with the connected receiving unit 30 for the purpose of loosening the dosage material inside the dosage unit 70.

The drive mechanism inside the holder unit for the opener module 40 includes a first actuator motor 45, a reduction gearbox 46, as well as the actuator element 47 which is configured as a disk-shaped gear 47 carrying on its underside next to the base plate 20 the elliptical guide track 48 that engages the guide pins 44 of the pusher arms 41 which protrude through the openings 22 of the base plate 20. The opener module is active only during short work phases in which the first actuator motor 45 turns the actuating element 47 by 90° and, by way of the elliptical guide track 48 and the guide pins 44, controls the opening and closing of the pusher arms 41, as the longer main diameter of the elliptical guide track 48 is oriented alternatingly in the transverse and lengthwise direction of the support arm 10.

Figure 8:
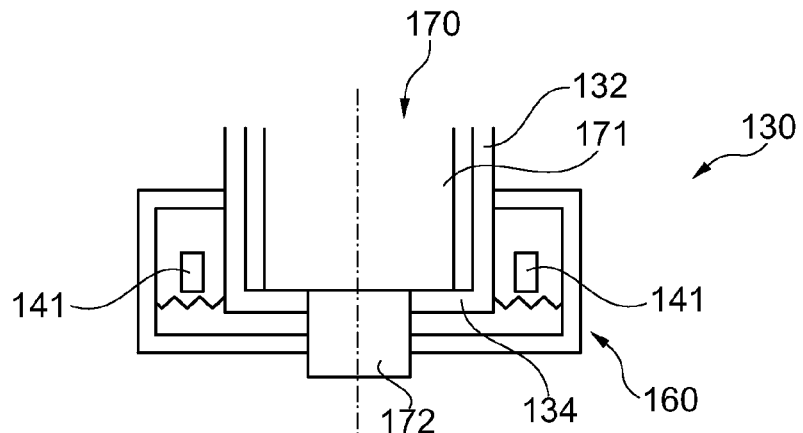
FIG. 8 is a schematic view of a second embodiment of the clamping module in dispensing position.
Figure 9:
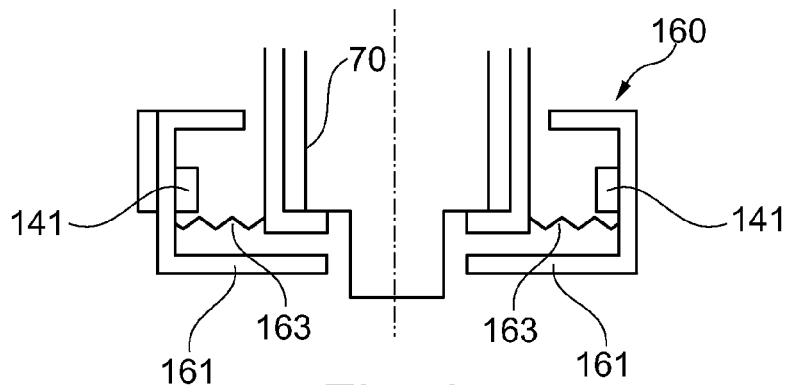
FIG. 9 is a schematic view of the second embodiment of the clamping module in loading position.

FIGS. 8 and 9 show a schematic cross-sectional view of an alternative, second embodiment in a plane that is orthogonal to the horizontal axis H and contains the central axis Z. The support arm still includes a holder unit with an opener module and an actuator as well as a receiving unit with a clamping module. In contrast to the embodiment of FIGS. 3 to 7 which has been described above, the support arm in the embodiment of FIGS. 8 and 9 is not rotatable about a horizontal axis H. In the loading phase, the dosage unit 170 is set into the receiving unit 130 with the dispensing head 172 already facing downward, with the shoulder of the source container resting on a ledge 134 of the seat 132. The two halves of the clamping module 160 in this example are not formed as stampings of an elastic sheet material, but are of a rigid, non-elastic design and have a pivoting connection to the receiving unit (not shown in detail) to enable their mobility between the dispensing position (FIG. 8) and the loading position (FIG. 9). Spring elements 163 in the form of tensile springs press the clamping jaw 161 in the dispensing position against the actuating member of the dispensing head 172 and in the loading position against the spread-apart pusher arms 141 of the opener module.

Except for differences in the detail design of the clamping module 160 in FIGS. 8 and 9, it should be emphasized here that the inventive concept of a clamping module which can be closed and opened with an opener module can also be advantageously employed in dosage-dispensing devices where the support arm is not rotatable and where the dosage unit is thus not being turned upside down after it has been set into the receiving unit. This applies in particular to dosage-dispensing devices that are equipped with an actuator to generate shaking- or shocking movements, during which the dosage unit must remain in solid contact to its seat in the receiving unit in order to ensure that the movements are transmitted to the dosage material to produce the desired loosening effect.

Figure 10:
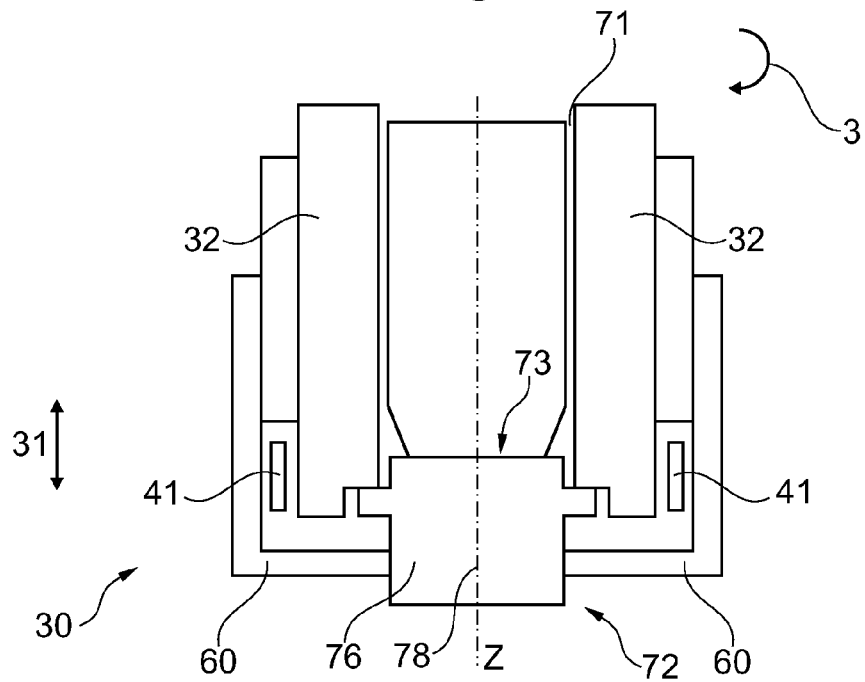
FIG. 10 is a schematic representation of the actuating functions to which the dosage unit in the dosage-dispensing device is subjected.

FIG. 10 schematically illustrates the receiving unit of FIGS. 3 to 7 in a sectional plane that is orthogonal to the horizontal axis H and contains the cylinder axis Z of the dosage unit 70. The purpose is to clarify once more and in general terms—i.e. independent of specific implementations of individual modules and elements—the functions to which a dosage unit of a dosage-dispensing device 1 is subjected, namely:

holding the dosage unit 70 secured in the receiving unit 30, for which purpose the actuating member 76 of the dispensing head 72 is clamped through spring tension between the clamping jaws 61 of the clamping module 60, wherein the clamp grip can be released and activated by swiveling the pusher arms 41 of an opener module 40 between an open and a closed position;

opening and closing the outlet orifice 78 to a variable extent, which is accomplished with a position-setting module 85 (see FIG. 3) turning the seat 32 (horizontally hatched part in FIG. 10) in the receiving unit 30 (diagonally hatched) about the central axis Z and thereby turning the base unit 73 (which is taken along in the rotation) with the screwed-on source container 71 against the actuating member 76;

loosening the dosage material contained in the dosage unit 70 through a shocking- or shaking movement (indicated by the arrow 31) by means of an actuator 50; and (if the apparatus has the requisite capability) turning the dosage unit 70 upside-down about a horizontal axis H (indicated by the circular arrow 3) by turning the support arm 10 relative to the support column 2.

Although the invention has been described through the presentation of specific examples of embodiments, it will be evident to the reader that numerous further variant embodiments could be developed from the teachings of the present invention, wherein for example the movement of the clamping jaws between the pulled-apart loading position and the clamped-down dispensing position could be controlled by the actuating force of electromagnets that are switched on or off. It is also conceivable that the pusher arms of the opener module are force-biased in the closing direction by a tensile spring and that the guide pins glide along the outside edge of an elliptical contour disk instead of in an elliptical guide track. It goes without saying that any such variations of the examples described herein with design elements that are familiar to practitioners in the relevant technical field are considered to be within the scope of the present invention.

What is claimed is:

1. A device for dispensing measured quantities of free-flowing substances from dosage units in which the substances are contained prior to being dispensed, the device comprising:

a support column;

a support arm which is horizontally cantilevered on the support column;

a holder unit on the support arm;

at least one movably supported receiving unit, each receiving unit arranged on the holder unit for removably setting at least one of the dosage units;

a clamping module for removably fastening the dosage unit to the receiving unit, the clamping module movable between a closed dispensing position and an open loading position;

an opener module, located on the holder unit and acting to spread the clamping module apart from the closed dispensing position to the open loading position, the opener module being uncoupled from the receiving unit when the clamping module is in the dispensing position; and at least one agitation actuator, arranged on the holder unit to transmit shaking or shocking movement to the receiving unit.

2. The device of claim 1, further comprising:

a spring element in the clamping module for tensioning thereof when the clamping module is in the closed dispensing position.

3. The device of claim 2, wherein:

the clamping module comprises a first and a second clamping jaw, between which the dosage unit is held in a position that is vertically defined and immovable relative to the receiving unit, when the clamping module is in the closed dispensing position.

4. The device of claim 3, further comprising:

a first position-defining element, arranged on at least one of the clamping jaws, the first position-defining element co-acting with a complementary projection formed on the dosage unit to hold the dosage unit in the receiving unit in a defined rotary position relative to a vertical rotary axis.

5. The device of claim 3, further comprising:

a first and a second pusher arm, arranged on the opener module for spreading apart the two clamping jaws, moving the clamping module from the closed dispensing position to the open loading position.

6. The device of claim 5, wherein:

each pusher arm has a first end that is pivotally connected to the holder unit and a second end that is arranged in a free space between the receiving unit and the clamping jaw.

7. The device of claim 6, wherein:

in the dispensing position, the second end of the pusher arm is spaced apart from, and out of contact with, the clamping module and the receiving unit.

8. The device of claim 5, further comprising:

a rotatable actuating element, arranged to move the pusher arms from the closed dispensing position to the open loading position.

9. The device of claim 5, further comprising:

a nose-shaped contour projection of the second end of each pusher arm, directed towards the respective clamping jaw.

10. The device of claim 1, wherein:

the clamping module is fastened to the receiving unit.

11. The device of claim 1, wherein:

the receiving unit is resiliently connected to the holder unit.

12. The device of claim 11, wherein:

the agitation actuator comprises:

a motor; and a cam disk or contour disk, communicated to the motor and arranged to transmit shaking- or shocking movements to the receiving unit.

13. The device of claim 1, wherein:

the support arm turns about a horizontal axis on the support column as the clamping module moves from the open loading position to the closed dispensing position.

14. The device of claim 1, wherein:

the clamping module comprises a first and a second clamping jaw, between which the dosage unit is held in a position that is vertically defined and immovable relative to the receiving unit, when the clamping module is in the closed dispensing position.

15. The device of claim 14, further comprising:

a first and a second pusher arm, arranged on the opener module for spreading apart the two clamping jaws, moving the clamping module from the closed dispensing position to the open loading position.

16. A device for dispensing measured quantities of free-flowing substances from dosage units in which the substances are contained prior to being dispensed, the device comprising:

a support column;

a support arm which is horizontally cantilevered on the support column;

a holder unit on the support arm;

at least one movably supported receiving unit, each receiving unit arranged on the holder unit for removably setting at least one of the dosage units;

a clamping module for removably fastening the dosage unit to the receiving unit, the clamping module movable between a closed dispensing position and an open loading position, the clamping module comprising:

a first clamping jaw; and a second clamping jaw;

the respective jaws arranged, when the clamping module is in the closed dispensing position, to hold the dosage unit in a position that is vertically defined and immovable relative to the receiving unit;

an opener module, located on the holder unit and acting to spread the clamping module apart from the closed dispensing position to the open loading position, the opener module being uncoupled from the receiving unit when the clamping module is in the dispensing position, the opener module comprising:

a first pusher arm; and a second pusher arm;

the respective pusher arms arranged on the opener module for spreading apart the two clamping jaws, moving the clamping module from the closed dispensing position to the open loading position; and an agitation actuator, resiliently connected to the holder unit to act on the receiving unit, the agitation actuator comprising:

a motor; and a cam disk or contour disk, communicated to the motor and arranged to transmit shaking or shocking movements to the receiving unit.

* * * * *